United States Patent

[11] 3,554,113

| [72] | Inventors | John A. Page |
| | | Minneapolis, Minn.; |
| | | Walter G. Bauer, Dickinson, Tex. |
| [21] | Appl. No. | 724,208 |
| [22] | Filed | Apr. 25, 1968 |
| | | Division of Ser. No. 453,695, May 6, |
| | | 1965, Patent No. 3,403,027. |
| [45] | Patented | Jan. 12, 1971 |
| [73] | Assignee | General Mills, Inc. |
| | | a corporation of Delaware |

[54] APPARATUS FOR PROCESSING PROTEIN FIBER
11 Claims, 5 Drawing Figs.

[52] U.S. Cl. ................................................. 99/234,
68/43, 68/99
[51] Int. Cl. .................................................... A47j 44/00
[50] Field of Search ........................................ 99/234, 14,
17; 100/174; 107/54; 68/5(.5), 28, 38, 43, 51, 99,
158, 199

[56] References Cited
UNITED STATES PATENTS

| 1,846,914 | 2/1932 | Sharp | 100/174 |
| 2,538,628 | 1/1951 | Pendleton | 68/43 |
| 3,242,702 | 3/1966 | Fleissner | 68/5(.5) |
| 3,299,676 | 1/1967 | Fujihashi | 68/5(.5) |
| 3,303,676 | 2/1967 | Witt | 68/158 |

FOREIGN PATENTS

| 16,049 | 6/1900 | Great Britain | 68/99 |

Primary Examiner—Walter A. Scheel
Assistant Examiner—Arthur O. Henderson
Attorneys—Anthony A. Juettner, William C. Babcock and Harold D. Jastram ABSTRACT: This apparatus is used in the food field to impregnate fibrous food product with flavoring, coloring, and fat ingredients by subjecting the food product to mechanical manipulation between stacked pairs of cooperating gear like members.

INVENTORS
JOHN A. PAGE
WALTER G. BAUER

INVENTORS
JOHN A. PAGE
WALTER G. BAUER

ATTORNEY

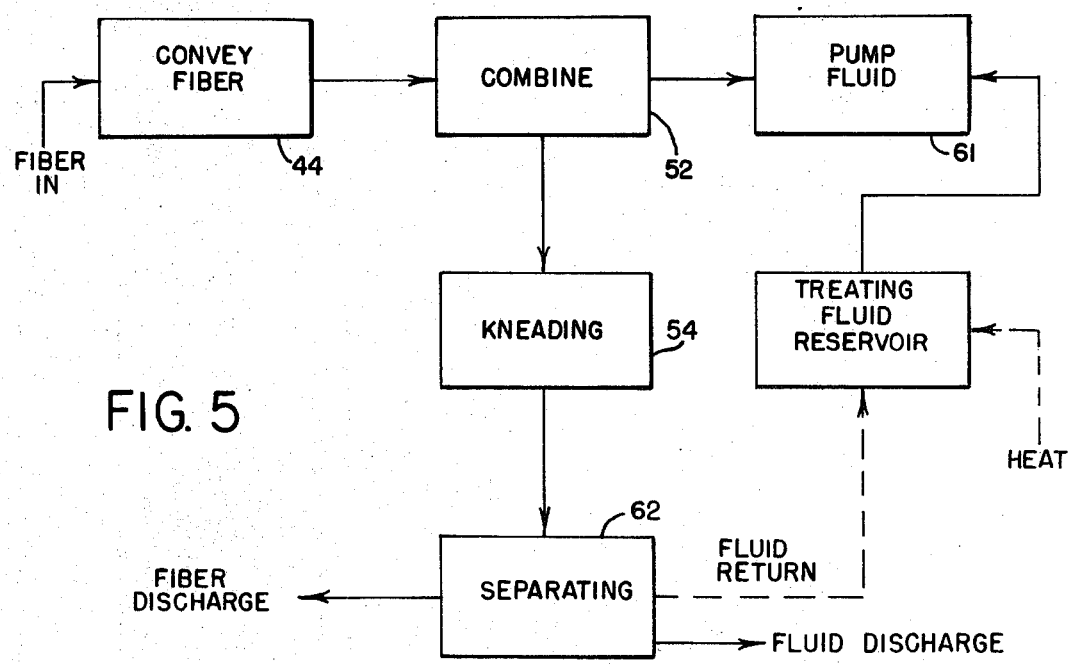

APPARATUS FOR PROCESSING PROTEIN FIBER

This application is a division of our copending application Ser. No. 453,695, filed May 6, 1965 now U.S. Pat. No. 3,403,027. This invention relates to an apparatus for treating a spun protein product, and more particularly an apparatus for treating edible fibrous protein products by treating the products in the presence of a fluid additive.

It is well known that artificial textile fibers can be prepared from vegetable and animal protein, such as soy protein, corn protein, peanut protein, casein and keratin. It is also known that such fibers can be used to prepare meat substitutes which can be made to simulate meat as to texture, flavor and appearance. As disclosed in Boyer U.S. Pat. No. 2,682,466, a meat substitute can be produced from edible protein material by forming protein fibers or filaments and then by suitable means, binding the fibers. These protein fibers are prepared from a spinning dope of protein which is forced through a porous membrane such as a spinneret to form fibers which are coagulated in a bath containing suitable acids and salt and oriented by suitable means, such as by a series of rolls revolving at increasing speeds. The fibers are placed in a salt solution such as sodium chloride of sufficient concentration to prevent the fibers from redissolving. Groups of these fibers in accordance with the method disclosed in the Boyer patent, are freed from excess liquid by squeezing or centrifuging. The toughness or tenderness of the resulting product can also be controlled to a degree by the amount of stretch which is imparted to the fibers in the initial forming procedure. This stretching results in an orientation of the molecules in the protein fibers. The fiber bundles can be arranged so that they simulate the meat of mammals, fish, fowl, and shell fish.

The fibers are normally treated further in order to produce a satisfactory simulated food or meat product since fat, flavoring, coloring, and the like must be added to achieve the desired meat characteristic. The bundles of fibers are often compacted so that easy processing of the entire product to effectuate cleansing, neutralization, coloring, binding, and flavoring of the product is very difficult. The compacted fibers or filaments tend to resist the impregnation of the bundle by the various processing or treating fluids which must be used to effectively change the raw protein product to a palatable and usable meat or food substitute. Many of the usual methods of treating such a fibrous protein product are often inefficient and do not result in a completely desirable finished product. The undesirable product results because the treating fluid, which may be a neutralizing agent, coloring material, flavoring agents, oils, fats or the like are not satisfactorily distributed throughout the bundle of fibers.

Thorough distribution of the treating fluid or addition throughout the fiber bundle, in many situations, has heretofore involved a costly and time consuming process. It is therefore highly desirable to have a process and an apparatus whereby the fibers may be treated in a continuous manner to produce a product which satisfactorily simulates meat and which accomplishes this result in an efficient manner.

It is therefore an object of the present invention to provide a new and improved apparatus for treating fibrous protein products.

It is another object of the present invention to provide a new and improved apparatus for impregnating spun protein fiber with a treating fluid.

It is a further object of the present invention to provide a new and improved apparatus for preparing simulated meat products from a fibrous protein product.

Another object of the present invention is to provide a new and improved apparatus for treating a fibrous protein product with a fluid by agitating and kneading the product in the presence of a treating fluid.

Another object of the present invention is to provide a new and improved apparatus for impregnating edible fibrous protein products with a treating fluid by directing the fibrous product through a tortuous path of thereby relatively moving surfaces in the presence of a treating fluid to impregnate the fibrous product with the treating fluid.

The invention also contemplates a novel apparatus, for carrying out the method, which may include a treating chamber for confining a treating fluid. A tow of fibrous protein product is directed into the treating chamber where the tow is combined with treating fluid. One or more gear pumps convey the tow and fluid through the treating chamber. The gear pumps form a tortuous path for the tow and move it through the chamber in a first direction and simultaneously pump the treating fluid in a direction opposite to the movement of the tow. A rotary seal situated near the egress of the treating chamber moves the tow out of the treating chamber to a subsequent processing station. The seal may be designed so that it also removes excess fluid from the impregnated fibrous product. A treating fluid supply system is provided to supply the needed treating fluid.

A complete understanding of the invention may be obtained from the following detailed description of an apparatus forming specific embodiments when read in conjunction with the drawings, in which:

FIG. 4 is a top view taken along line 4–4 in FIG. 1; and

FIG. 5 is a block diagram of a process for treating a tow of fibrous protein products.

The fibrous product can be produced by any of a number of methods known in the art. A wide variety of protein materials which are edible can be used in preparing the product. Representative of such materials are soybean, corn, peanut, and pea proteins as well as various animal proteins such as casein. The edible protein may be prepared for example by dispersion in an alkaline medium in varying amounts, such as from about 10 to 30 percent by weight. A suitable alkaline medium is water containing an alkali metal hydroxide, that is about 5 to 10 percent by weight sodium hydroxide. The pH of the spinning solution can be varied within relatively wide limits but may generally be in the range of 9 to 13.5. Viscosity, pH, temperature, and concentrations of alkali, metal hydroxide, and protein will vary somewhat with the particular protein being dispersed.

The dispersion of spinning dope is forced through a porous membrane, such as a spinneret used in the production of rayon, and into a coagulating bath which is generally an acid and salt solution. The streamlets coming through the spinneret are precipitated in the form of filaments or fibers having a diameter of about 0.003—0.004 inch. Alternatively, coarser filaments or fibers can be produced by starting with the proteins in the form of powdered material and plasticizing them with about 25 percent alkaline water and then extruding the plasticized protein material through dies. The filaments of fibers produced by such a process have a much greater thickness which resemble paint brush bristles. It is also possible to have a series of spinnerets producing filaments or fibers from the protein dispersion.

The fiber product is then processed in a coagulating bath of aqueous solution of a salt and an acid. The salt, sodium chloride for example, can be used in widely varying concentrations. The acid can be any of those normally used in the coagulating bath. Representative acidic compounds are acetic acid, lactic acid, citric acid, adipic acid, hydrochloric acid and the like. The concentration of the acid in the bath normally varies between about 0.5 to 10 percent by weight.

The filaments or bundle of fibers are then stretched by pulling them from the coagulating bath over takeup reels. A variety of methods may be used to stretch the filaments or bundles of fibers to the proper length, texture, and so forth.

Figure 1:
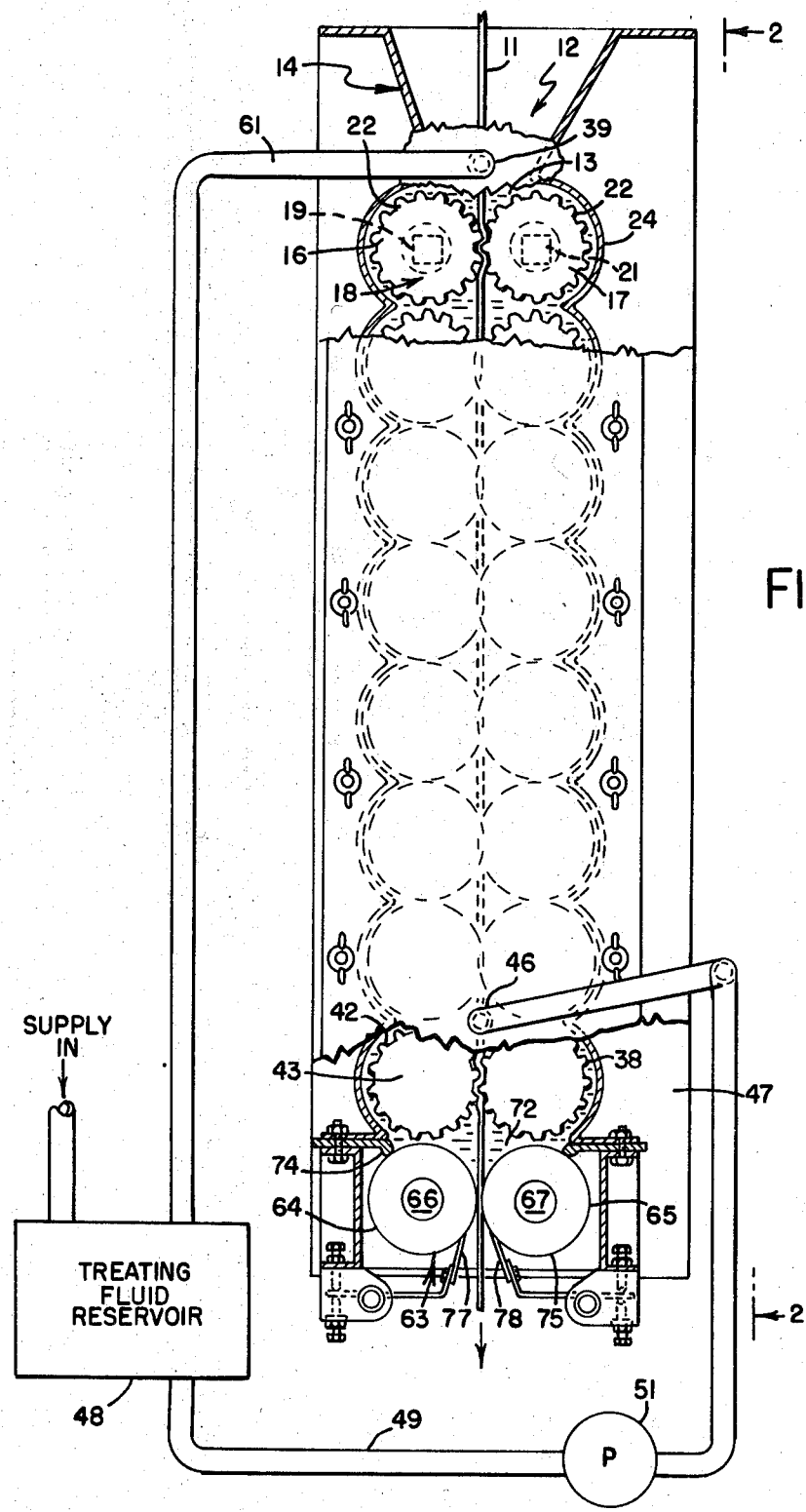
FIG. 1 is a front view of an apparatus according to the present invention showing the major components of the apparatus.

The pH of the filaments or bundles of fibers leaving the coagulating bath is generally in the range of about 1.0 to 4.0. Spinning has been successfully accomplished at higher pH's, 4.5 for example. Products prepared from this protein product normally have a sour taste and are normally very dry and tough. Thus, the fibers must be further processed. This further processing includes neutralization of the product by passage of the fibers through a neutralizing bath or finishing the product by adding coloring, flavoring, fats, binding agents and the like. Refer now to FIG. 1 of the drawings. A bundle of filaments or fibers of protein product 11 forming a tow, is directed into the tow input 12 of a treating chamber 13. Treating chamber 13 is formed by a housing 14. (See FIG. 1).

The tow 11 is directed between a pair of gears 16 and 17 which form a gear pump generally designated by numeral 18. The gears 16 and 17 are mounted in the chamber 13 of housing 14 on shafts 19 and 21 respectively. The gears 16 and 17 are mounted so that the teeth 22 on the respective gears mesh but do not contact the teeth of the meshing gear. The gears 16 and 17 are positioned so that although the teeth 22 of each gear mesh, there is a space between the meshing gear teeth 22. (Refer to FIG. 3). This space is provided to permit the tow 11 to pass between the gear teeth 22 without being cut, smashed or otherwise damaged by the meshing teeth 22. Gears 16 and 17 are driven in the arrow directions illustrated in FIG. 1 so that the tow 11 is directed between the teeth and discharged by the rotating gears 16 and 17.

The chamber is formed so that it conforms to the shape of the gears 16 and 17. The portion of the housing 14 which is adjacent the gears 16 and 17 is in the form of an arc 24 so that there is a close fit between the ends of the teeth 22 and the housing 14. This permits the rotating gears 16 and 17 to act as a fluid pump.

Figure 2:
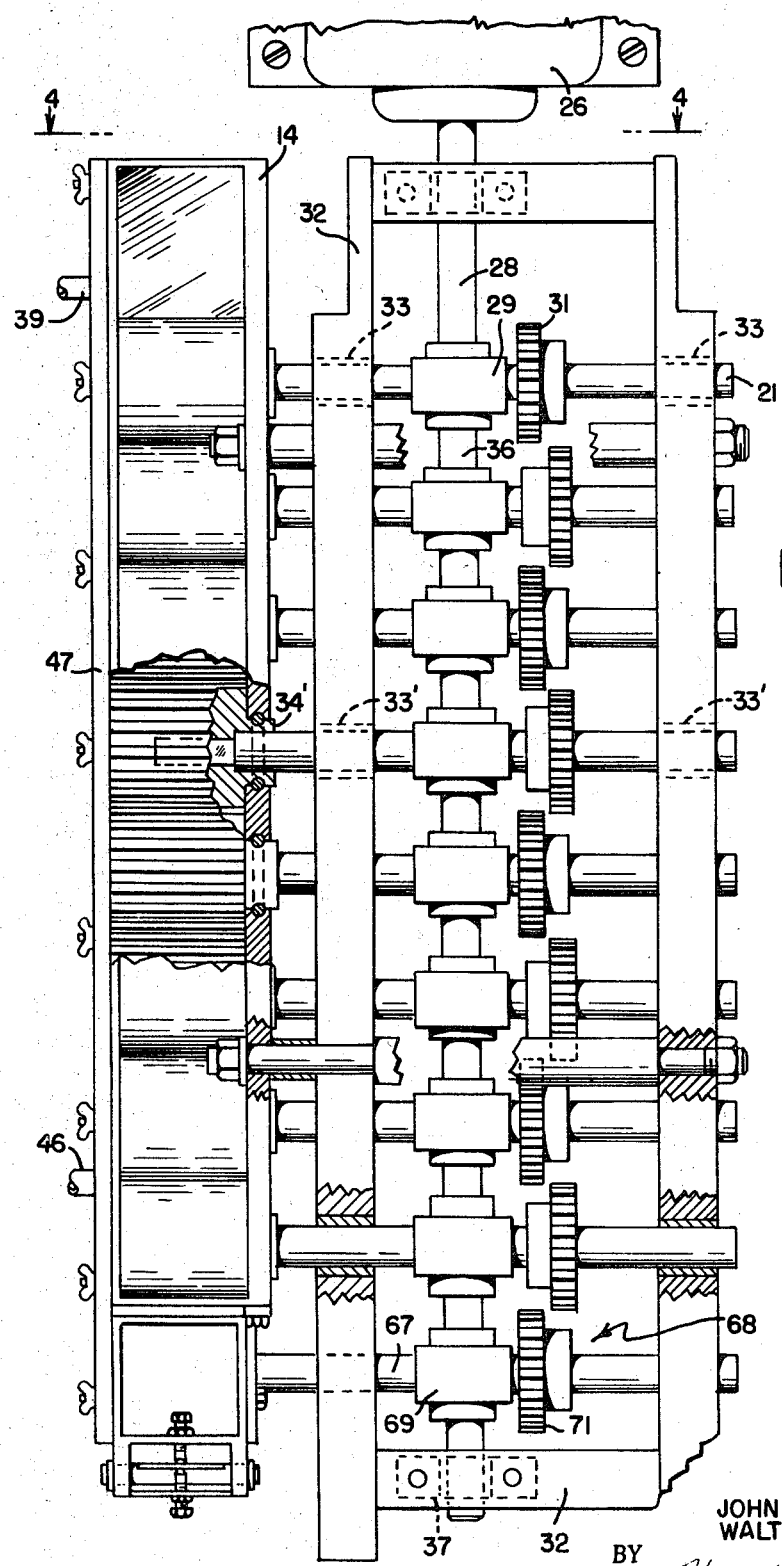
FIG. 2 is a side view of the apparatus disclosed in FIG. 1 taken along lines 2–2 in FIG. 1.

The gears 16 and 17 are driven by a motor and gear drive illustrated in FIGS. 2 and 4 of the drawing. The gears 16 and 17 are connected to shafts 19 and 21 respectively as illustrated in FIGS. 1 and 4. These shafts 19 and 21 are in turn driven by a motor 26 which drives the shafts 19 and 21 through a gear train generally designated by the numeral 27. Motor shaft 28 is connected to a right angle gear system 29. This right angle gear system applies power from the motor 26 to the shaft 21. The right angle drive 29 may be any one of a number of such commercially available right angle drives. The right angle drive 29 rotates shaft 21 and the attached spur gear 31. Spur gear 31 is attached to the shaft 21 in a well known manner. Shaft 21 is mounted in frame 32 on bearings 33. The bearings 33 may be simple sleeve bearings or they may be ball bearings or the like. The type of bearings used will depend on the speed of operation of the apparatus and the lubrication difficulties encountered. The shaft 21 is mounted in the housing 14 on a bearing 32. This is a conventional construction for mounting the shaft 21. The spur gear 31 drives an identical spur gear 35 which is attached to shaft 19. Shaft 19 is mounted in frame 32 and in housing 14 in exactly the same way that shaft 21 is mounted. The right angle drive is attached rigidly to the frame 32 of the apparatus.

Figure 3:
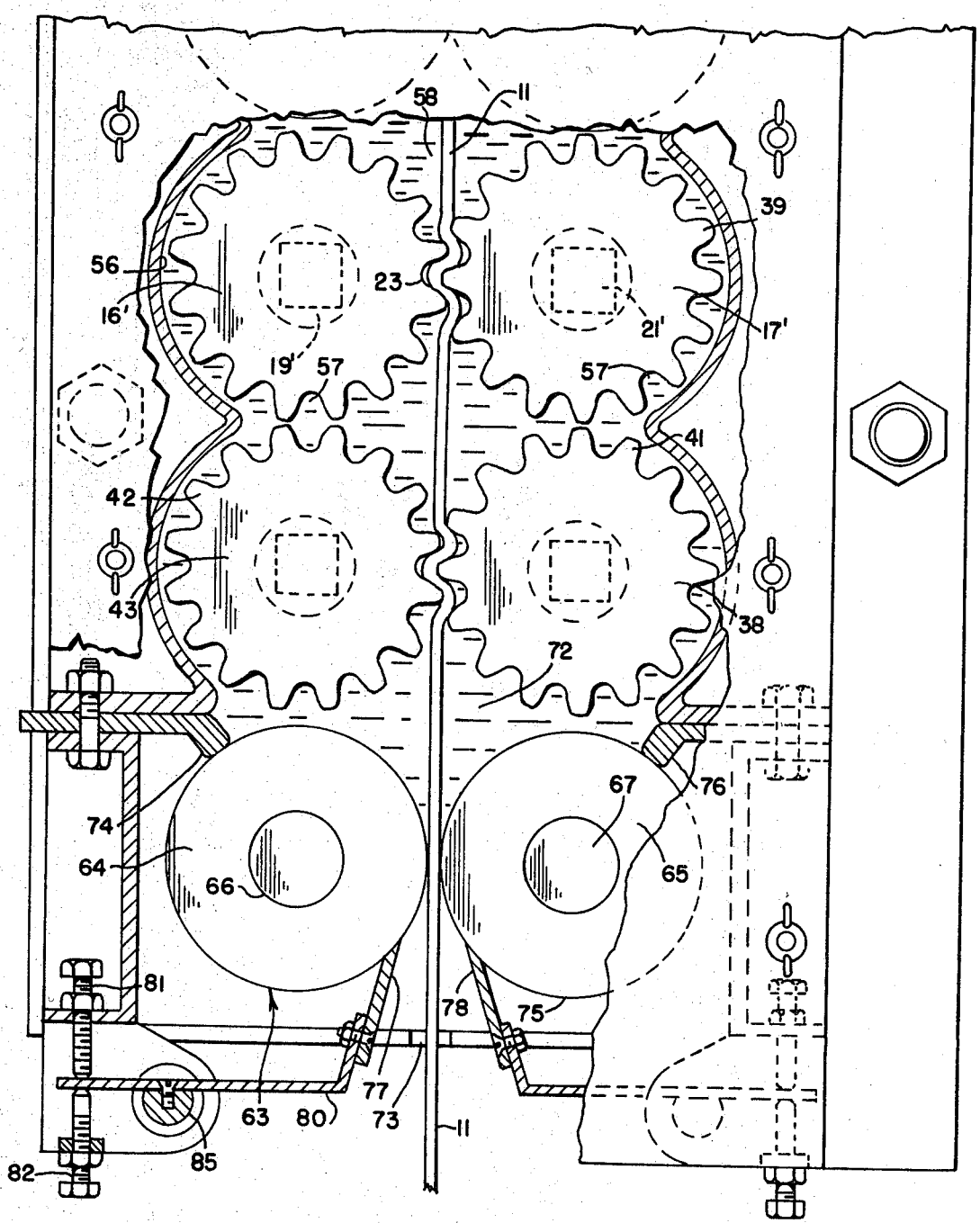
FIG. 3 is a fractional view showing an enlargement of the bottom portion of the apparatus shown in FIG. 1.

It will be observed that the motor and the gear arrangement drive the gears 16 and 17 in the arrow direction noted in FIGS. 1 and 3 of the drawings. With the described drive, the gears 16 and 17 rotate at the same number of r.p.m.'s and in a direction so that the tow 11 moves between the gears through the chamber 13. In FIG. 1, the apparatus is illustrated as a vertical arrangement where the tow 11 is directed vertically downward from the tow input 12 by the gears 16 and 17.

A series of fluid pumps such as the fluid pump 18 are connected one above the other, in a vertical arrangement, so that the pumps cooperate to convey the fiber tow 11 through the chamber 13. (A vertical arrangement is preferred, however, the apparatus will function in other positions also.) Each of these pumps is exactly like the pump 18 and operates in exactly the same manner as described above in connection with pump 18. It will be observed in FIG. 2 of the drawings that the same motor 26 is connected through a series of right angle drives identical to drive 29 which forms a part of a gear train identical to gear train 27. Accordingly, the motor 26 drives all of the pumps at the same number of r.p.m.'s through identical gear systems. The individual right angle drives are interconnected by shaft 36 so that the individual pumps each operate at the same number of r.p.m.'s. The shaft 36 is connected at the bottom to the frame 32 and is mounted on a bearing 37.

Since the gears of each of the gear pumps rotate in exactly the same direction as that described in connection with pump 18, each successive pump acts as a guide for directing or conveying the fiber tow 11 through the chamber 13 without the tow 11 wrapping about the gears. Refer to FIG. 3 of the drawings to observe this action. Since the gear pumps each operate exactly the same, it will be noted in FIG. 3 that the adjacent gears 17' and 38 are moving in opposite directions at the point where the teeth on the respective gears are closest. This is due to the fact that each of the gears 17' and 38 are rotating in a counterclockwise direction. Therefore, the lowermost gears of gear 17' are moving to the right as viewed in FIG. 3 while the uppermost teeth of gear 38 are moving to the left. Thus, if tow 11 has a tendency to adhere to the gear teeth 39 and move toward the right following the rotation of gear 17', the crown of teeth 41 of gear 38 will sweep close to the crown of teeth 39, and dislodge the tow 11 thus directing it between gears 38 and 43. The pumps are driven so that the crowns of the teeth of adjacent gears sweep past each other. If the crown of the teeth of one gear coincides with a root of an adjacent gear, then the tow may pass between the gears and this is to be avoided. The gears 16' and 43 perform the same sweeping function and thus tow 11 is directed between each successive set of pumps in the chamber 13.

Thus, the series of pumps described in detail in connection with pump 18 act as a conveying means for moving tow 11 through a chamber 13. This conveying of the fiber is illustrated in FIG. 5 by block 44. It will be observed from the mechanical means utilized to form these pumps that the various gears illustrated by gears 16 and 17 may be rotated at a wide variety of speeds depending upon the rate of movement of the tow 11 desired for the particular treatment desired for the tow 11. If tow 11 requires a great deal of impregnation of the treating fluid, the gears 16 and 17 can be operated at a relatively higher r.p.m. thus resulting in faster movement of the tow 11 through the chamber 13 but which also tends to force more treating fluid into the tow. If merely surface treatment of the tow 11 is desired, of course, the individual pumps 18 can be operated at lower speeds. These varying rates of conveyance through chamber 13 can be accomplished by simply changing the gear ratio in the gear trains illustrated by gear train 27 or it can be accomplished by varying the speed of the motor 26. Either of these methods is perfectly acceptable.

Simultaneously with the conveyance of the tow 11 into chamber 13, treating fluid is introduced into the chamber 13 through a fluid input 46 which is situated in one wall 47 of the chamber 13. The treating fluid is pumped from a treating fluid reservoir 48 through a supply line 49 by pump 51 and into the chamber 13 where it is combined (see block 52 of the block diagram in FIG. 5) with the tow 11 which is being conveyed through the chamber 13. The treating fluid fills the space 53 between the successive sets of gear pumps so that the tow 11 is subjected to the treating fluid and is impregnated by the treating fluid. The treating fluid also flows into the area between the individual gears 16 and 17 where the tow 11 is agitated by the meshing gears 16 and 17. The teeth of the meshing gears tend to agitate the tow 11 (see block diagram 54 in FIG. 5) so that the individual fibers of the tow 11 are moved about and opened to permit the treating fluid to flow into the tow 11 and about the individual fibers. This produces effective and efficient impregnation of the tow 11 by the treating fluid. The individual gear pumps, represented by pump 18, each operate as a separate pumping unit to convey treating fluid situated between successive sets of gear pumps to the next adjacent pump above as viewed in FIG. 1. This pumping action can be observed in FIG. 3 wherein the lowermost set of teeth of the gears 16' and 17' are moving adjacent to the wall 56 of the chamber 13. Therefore, the fluid which is in the space 53 between the successive sets of pumps, tends to be captured in the openings 57 between the teeth on the gears 16', 17' and between the gear teeth and the wall 56. The treating fluid is carried upwardly by the counter rotation of the respective gears to the next higher reservoir or open space 58. In this way, the treating fluid is conveyed or pumped from the fluid input 46 vertically upward by each successive set of pumps until the fluid arrives at the tow input B of chamber 13 which is above the last set of gears 16 and 17. A fluid outlet 39 is positioned in the wall 47 of the apparatus and furnishes a discharge outlet for the treating fluid which is not used to impregnate tow 11. The treating fluid which is pumped by pump 18 flows out discharge line 61 and may either be discarded or the discharge line may be returned to the treating fluid reservoir.

The treating fluid is thus separated from the tow 11 at the top of the chamber 13 where the tow enters chamber 13. If the treating fluid happens to be a contamination laden material at the fluid outlet 39, which cannot be treated for further use, then the treating fluid may be discharged as waste. However, if the treating fluid is a flavor enhancing material then the excess treating fluid may be reusable in which case, the treating fluid can be returned to the treating fluid reservoir.

Thus it will be observed that the treating fluid is pumped by the gear pumps (see block diagram 61) into combination with the tow 11. It is also kneaded by the gear pumps. The treating fluid and tow 11 are then separated (see block diagram 62) and the treating fluid is discharged. The treating fluid can either be returned to the treating fluid reservoir or be discharged depending upon the nature of the treating fluid. It will be observed that the movement of the treating fluid is counter to the movement of the tow 11 through chamber 13. This counter movement of the treating fluid promotes impregnation of the tow 11 and control of the treatment of the tow 11 by the treating fluid. The fluid near the tow input 12 contains less solids (if other than water) then when it entered chamber 13 and this light fluid is believed to open the tow so that the tow can be more readily impregnated by the heavier fluid near the fluid input 46.

The treating fluid which is utilized in connection with a tow of fibrous protein product 11 may be any number and types of materials depending upon the result to be accomplished. For instance, if the fiber or tow 11 is to be neutralized to raise the pH of the product from 1.0 to 4.0 up to a range of about 4.5 to about 7.0, the neutralizing agent may (for example) be a salt solution containing an alkali metal hydroxide or bicarbonate. The treating fluid may also be an alkaline agent other than alkali metal hydroxide. Particularly good results are obtained when the tow 11 is to be neutralized by using aqueous solutions of alkali or alkaline earth metal sulfides. The neutralization may also be carried out by simply using water as the treating fluid to wash the tow 11. The treating fluid is simply introduced into the chamber 13 with the tow 11 to wash the product. As noted, the washing is accomplished by agitation of the tow 11 between the individual of the individual gear pumps which form a tortuous path through which the tow 11 is forced to move.

On the other hand, the treating fluid which is introduced at the fluid input may be an additive including such materials as binders, flavoring agents, coloring agents, and the like together with a fat. Suitable binders include edible materials such as starches, cereals, dextrines, proteins, gums, alginates and the like. Preferably, if a binder is involved to bind the individual fibers together, the binder is a heat coagulable protein such as albumen. Various meat flavorings which are available commercially can be added to the treating fluid. Representative thereof are bouillon cubes having chicken, beef, and other meat flavors. Synthetic ham and sausage flavors may also be added to the treating fluid. Additionally, the treating fluid may contain a variety of spices, salts, and other flavoring agents.

Vegetable fats and animal fats can also be added to the fibers. Representative thereof are soybean oil, cottonseed oil, corn oil, coconut oil, palm kernel oil, olive oil, peanut oil, sesame seed oil, tallow, lard, chicken fat, butter, cod liver oil, and the like.

Thus it can be seen that the treating fluid which is introduced through the input 46 can be any number of fluids utilized to process the tow 11 or a fluid which is a mixture and/or solution of liquids and solids so that a particular product having unique characteristics will result from the treatment.

The separating step illustrated in block 62 of FIG. 5 can be accomplished in the mechanism illustrated in FIGS. 1 and 3 by utilizing a rotary seal generally designated by the numeral 63. The rotary fluid seal 63 has two rollers 64 and 65 which are positioned closely together on shafts 66 and 67 respectively. These shafts 66 and 67 are mounted in the frame 32 of the apparatus in the same manner as shafts 16 and 17 of the gear pump 18. The rollers 64 and 65 are rotated in the arrow direction illustrated in FIG. 3 of the drawings in the same manner as the gear pumps are operated. Refer to FIG. 2 of the drawings where it is noted that the shaft 67 is driven through a gear system 68 identical to the gear system utilized in connection with each of the fluid pumps. Motor 26 provides power to a right angle drive 69 which in turn drives spur gear 71. Gear 71 engages an identical spur gear on shaft 66 and accordingly, rotates the rollers 64 and 65 in the arrow directions illustrated in FIG. 3.

The rollers 64 and 65 are positioned a slight distance apart so that as the treating fluid impregnated tow 11 passes between the rollers 64 and 65, the tow 11 cooperates with the rollers 64 and 65 to provide a liquid seal to prevent treating fluid in area 72 from passing between the two rollers. This slight separation of the rollers 64 and 65 also permits the tow 11 to pass between the rollers without substantial damage or crushing. The rollers 64 and 65 are close enough so that some treating fluid is removed from the tow 11 prior to its discharge from tow outlet 73. The treating fluid in area 72 illustrated in FIG. 3 of the drawings is pumped by the gears 43 and 38 away from the area 72 and upwardly through the chamber 13. However, since a substantial quantity of fluid does accumulate in the area 72, fluid seals 74 and 76 are provided to prevent the fluid from passing between the rollers 64 and 65 respectively. These seals 74 and 76 are flexible seals which contact the rollers and may be constructed from a number of materials used for that purpose such as nylon or similar wear resistant plastics.

Frequently, material adheres to the surface 75 of the rollers. This material is an accumulation of treating fluid which passes between the rollers 64 and 65 and small bits of fiber from the tow 11. If these deposits are permitted to build up, the seal 63 will fail to function as effectively as might be expected due to the deposits which will be forced between the rollers 64 and 65. Further, such deposits might damage the tow 11 passing between the rollers. Accordingly, a pair of knives or scrapers 77 and 78 are provided to remove the deposits from the surface 64 and 65 respectively. These scrapers contact or ride very closely to the surface of the rollers to remove any deposit buildup. The scrapers are adjustable. The scraper 77, for example, is connected to a pivot arm 80 which is attached to a shaft 85. Adjusting bolts 81 and 82 contact opposite sides of arm 80 to pivot the arm 80 about shaft 85. This in turn moves scraper 77 with respect to roller 64.

Thus it will be observed that the above-described apparatus can be utilized to carry out processing of the tow 11. The apparatus provides a means of conveying the fiber 11 through a treating chamber 13 where the tow 11 is combined with a treating fluid (which may be an additive). The additive is pumped through the chamber 13 in a direction counter to the movement of the tow and the tow is agitated in the presence of the treating fluid. This agitation, as previously explained, permits complete impregnation of the fibrous tow 11 by the treating fluid. The gear pumps in the above-described preferred apparatus provide both the means for pumping the treating fluid counter to the direction of movement of the tow 11 and they also provide the agitating action which enhances impregnation of the tow 11. The tow is then separated from the treating fluid, as for example, a neutralized fibrous tow or as a flavored simulated meat product depending upon the nature of the treating fluid. The excess additive or neutralizing fluid is then either discharged or returned to a reservoir 48 where it is reused.

In the event the treating fluid is an additive utilized for providing the flavor and other characteristics of a particular meat product, it has been found that a preferred process for treating the additive is to heat the additive somewhat above the melting point of the oil being utilized. It has been found that if the additive is heated in this manner, prior to introduction into the chamber 13, that a very satisfactory simulated meat product can be produced. In such a case, the additive can be pumped through the chamber 13 by the gear pumps at a rate sufficient to discharge the additive before the additive has a chance to cool to any degree. However, it has been found that if the pumping action is adjusted by simple mechanical adjustment of the gear pumps, the additive will cool to a temperature below the melting point of the oil utilized. In this case, it has been observed that as the additive moves upwardly through the chamber 13 illustrated in FIG. 1, and cools as it approaches the top of the chamber 13 near the tow inlet 12, the rate at which the oil in the additive is picked up by the tow near the tow inlet 12 is increased. Thus, in this preferred process where the serum is permitted to cool below the temperatures of the oil utilized in the additive, the excess additive removed from the chamber 13 by a discharge line 61 will have a temperature somewhat below the melting point of the oil. This excess additive is then reheated in the treating fluid reservoir or by a separate unit so that the additive is again brought to a temperature above the melting point of the oil utilized, prior to introduction into the chamber 13 at the inlet 46.

The invention will be more thoroughly understood from reference to the following examples of a simulated meat product which can be produced on the preferred apparatus by the process described hereinbefore. The percentages are listed by weight.

Example I

To produce a hamburger or beef, 1.2 pounds of additive consisting of a serum and a fat were prepared for each 1 pound of fibrous protein material to be treated. The fat which constitutes about .2 pounds of the additive may be either an animal fat or a vegetable fat or a combination thereof depending upon the finished flavor desired, the marketing objectives and so forth. Preferably, a vegetable shortening is used and coconut oil was the shortening utilized in this example. The serum was prepared from the following ingredients by conventional mixing methods and contained the following percentage of the ingredients based on the weight of the serum.

| Ingredient: | Percent by weight |
|---|---|
| Water | 51.0 |
| Egg white | 15.0 |
| Wheat gluten | 10.0 |
| Soy flour | 8.0 |
| Onion | 7.0 |
| Sugar | 5.0 |
| Hydrolyzed protein | 2.0 |
| Salt | 1.0 |
| Monosodium glutamate | 0.5 |
| Artificial color | 0.5 |
| | 100.0 |

The serum and oil were then combined with a quantity of fibrous protein material. This protein may be made from vegetable sources such as corn or soybean. Preferably, soybean protein is used as was the case in this example. The combined oil, fibrous material and serum were intensely agitated to thoroughly impregnate the fibrous material with the serum and oil. The serum and oil were pumped counter to the direction of the movement of the tow 11. The serum and oil were heated to a temperature of about 92° F. which is somewhat above the melting point of about 88° F. of the coconut oil. The serum was retained in the presence of the agitated tow for a sufficient length of time so that the serum and oil cooled to a temperature of 80° F. prior to separation of the fiber from the serum. The serum and oil was then returned to a treating fluid reservoir where the serum was reheated to the original temperature and was then recirculated for further treating of additional tow. The resulting impregnated fibrous soybean protein had the taste, color, texture and other desirable characteristics of beef. This simulated beef was then ground to a consistency of hamburger and then dried so that it could be stored with little or no loss of quality. Beef chunks could also have been made by cutting rather than grinding the finished product.

Example II

Simulated chicken or seafood was prepared by method set forth in example I with certain minor variations. The additive was added to the fibrous protein product on the basis of .7 pounds of additive per 1 pound of fibrous soybean material. The fat constituted .2 pounds of the additive, the remainder being serum which contained the following ingredients by percentage based on the weight of the serum.

| Ingredient: | Percent by weight |
|---|---|
| Water | 50.0 |
| Egg white | 24.0 |
| Seasonings | 7.0 |
| Sugar | 4.0 |
| Salt | 4.0 |
| Monosodium glutamate | 0.6 |
| Artificial flavorings | 0.4 |
| | 100.0 |

The finished simulated meat product was diced. As noted previously, the product may be ground or otherwise processed and dried as is desired depending upon the end use of the simulated meat products.

The treating fluid utilized may constitute a fluid for neutralizing a highly acidic characteristic of the tow 11. A more specific example of neutralizing is illustrated by an acidic protein product such as soybean which is fed into the tow input 12 of the apparatus. The treating fluid introduced at the lower end of chamber 13 was a .1 to 1.0 percent solution of $Na_2SO_3$. The fibrous tow 11 and treating fluid were then agitated and the tow was thoroughly saturated by the sulfite solution. This treatment of the acidic protein product with the sulfite solution will raise the pH of the product from the initial 3.0 to 3.2 range to a pH of from about 5.5 to about 6.0.

After the neutralizing has been accomplished in the above solution the tow 11 may contain a slight excess of neutralizing solution and this neutralizing solution may be simply washed from the tow 11. It is also possible to water wash the tow 11 to remove the excess basic treating fluid which is entrapped in the tow 11 and which passes beyond the fluid seal 63 with the tow.

It is possible to connect, in tandem, identical sets of apparatus described herein for accomplishing a number of processing steps utilizing different treating fluid. For example, the first apparatus utilized may involve a process where the tow 11 is neutralized to reduce the acidity of the tow. In this case, the neutralizing solution may be the $Na_2SO_3$ as noted herein. After the tow has been subjected to the process described herein, the neutralized tow may then be fed into another preferred apparatus where the treating fluid is simply water. In this case, the water is utilized to wash away excess $Na_2SO_3$ which may be entrapped in the tow 11. After the tow 11 is washed according to the process set forth in FIG. 5 of the drawings, the discharged tow 11 may then be directed into another preferred apparatus wherein the treating fluid might be the combination of a serum and oil as noted in examples I and II. The tow 11 which is discharged after completing the process set forth in FIG. 5 would then be a simulated meat as described in examples I and II which is ready for further processing and merchandizing.

It is to be understood that the above-described arrangement and description of preferred apparatus are simply illustrative of the application of the principles of the invention. Numerous other arrangements may be readily devised by those skilled in the art which will embody the principles of the invention and fall within the spirit and scope thereof.

We claim:

1. An apparatus for impregnating a fibrous tow with a treating fluid which comprises a housing having a chamber with a tow inlet at one end of the chamber and a tow outlet at the other end thereof, said tow outlet being located below the level of said fluid, supply means for directing fluid into said chamber and for removing said fluid from said rotary chamber, rotary pumping means positioned in said chamber and cooperating with said supply means for pumping said fluid through said chamber in a first direction and for conveying said tow in the opposite direction through said chamber, means for driving said rotary means, and seal means associated with said tow outlet for removing excess fluid from said tow and for sealing said chamber at the tow outlet to prevent passage of said fluid with said tow.

2. An apparatus in accordance with claim 1 in which said rotary means comprises a series of pairs of gears positioned in said chamber.

3. An apparatus in accordance with claim 1 in which said seal means comprises a pair of engaged rotary rollers.

4. An apparatus in accordance with claim 3 which further includes fluid seals contacting each of said rollers and positioned in said channel for preventing said fluid from moving past said rotary seals.

5. An apparatus in accordance with claim 3 which further includes a scraper associated with each of said rotary rollers and attached to said housing for removing deposits of fluid and fibrous tow which adhere to said rollers.

6. An apparatus for impregnating a fibrous tow with a treating fluid which comprises a housing having a chamber with a tow inlet at one end of the chamber and a tow outlet at the other end thereof, said tow outlet being located below the level of said fluid, supply means including a fluid inlet into said chamber adjacent said tow outlet and in a fluid outlet from said chamber adjacent said tow inlet for directing fluid into said chamber, and for removing said fluid from said chamber, at least two pairs of rotary gear pumps positioned in said chamber and cooperating with said supply means for pumping said fluid through said chamber in a first direction and for conveying said tow in the opposite direction through said chamber, means for driving said gear pumps, and a rotary seal associated with said tow outlet for removing excess fluid from said tow and for sealing said chamber at the tow outlet to prevent passage of said fluid with said tow.

7. An apparatus in accordance with claim 6 in which the fluid inlet is located in said housing between said rotary seal and an adjacent gear pump and in which the fluid outlet is located in said housing between the tow inlet and an adjacent gear pump.

8. An apparatus in accordance with claim 6 in which the housing is vertically aligned to position said tow inlet at the top of said chamber.

9. An apparatus in accordance with claim 6 in which each rotary gear pump has a pair of meshing spur gears and in which the spur gears are spaced a sufficient distance to permit the tow to move in a tortuous path between the spur gears.

10. An apparatus in accordance with claim 9 in which the rotary seal includes a pair of rollers which are spaced a sufficient distance to permit the tow to move between the rollers without damage to the tow but which are sufficiently close to discharge said tow from the presence of the fluid while preventing passage of said fluid between said rollers with said tow.

11. An apparatus for impregnating a fibrous tow with a treating fluid which comprises a vertically elongated housing having a chamber, a tow outlet at the bottom end of said chamber and a tow inlet at the other end of said chamber, supply means including a fluid inlet into the chamber adjacent said tow outlet for directing fluid into said chamber and a fluid outlet from said chamber adjacent said tow inlet for removing said fluid from said chamber, at least two pairs of rotary gear pumps positioned in said chamber, said pairs being arranged one above the other in a vertical series, said gear pumps cooperating with said supply means for pumping said fluid through said chamber in a first direction and for conveying said tow in the opposite direction through said chamber, means for driving said gear pumps, and a rotary seal associated with said tow outlet for removing excess fluid from said tow and for sealing said chamber at the tow outlet to prevent passage of said fluid with said tow.